United States Patent [19]

Oesterhelt et al.

[11] 3,870,568

[45] Mar. 11, 1975

[54] HEAT GENERATOR

[75] Inventors: Gerhard Oesterhelt; Josef Winkler, both of Nurnberg; Dieter Falkenberg, Erlangen; Eugen Szabo de Bucs, Bubenruth, all of Germany

[73] Assignee: Siemens Aktiengesellschaft, Berlin and Munich, Germany

[22] Filed: Feb. 28, 1974

[21] Appl. No.: 447,010

Related U.S. Application Data

[63] Continuation of Ser. No. 290,161, Sept. 18, 1972, abandoned, and a continuation-in-part of Ser. No. 38,766, May 19, 1970, abandoned.

[30] Foreign Application Priority Data

May 24, 1969 Germany ............................ 1926645

[52] U.S. Cl. .................. 136/212, 136/204, 136/237, 136/205

[51] Int. Cl. .............................................. H01z 1/30

[58] Field of Search ........... 136/237, 205, 203, 204, 136/211, 212, 202

[56] References Cited

UNITED STATES PATENTS

| | | | |
|---|---|---|---|
| 3,276,915 | 10/1966 | Horsting et al. | 136/205 |
| 3,296,034 | 1/1967 | Reich | 136/212 |
| 3,510,363 | 5/1970 | Winkler et al. | 136/205 |
| 3,530,009 | 9/1970 | Linkaus et al. | 136/212 |
| 3,543,842 | 12/1970 | Merges | 136/205 |
| 3,615,870 | 10/1971 | Crouthamel | 136/212 |

FOREIGN PATENTS OR APPLICATIONS

| | | | |
|---|---|---|---|
| 1,106,608 | 3/1968 | Great Britain | 136/205 |

*Primary Examiner*—Harvey E. Behrend
*Attorney, Agent, or Firm*—Herbert L. Lerner

[57] ABSTRACT

The invention relates to a heat generator having metal plates which are coupled to a cold heat exchanger in electrically insulating and thermally conducting relation. A bilaterally metallized ceramic plate has a surface facing the thermoelement legs of a thermoelectric component and contacting metal plates which contact the front surfaces of the cold ends of the thermoelement legs. A second metal plate contacts the surface of the ceramic plate facing away from the thermoelement legs. At least one surface of the metal plates contacting the thermoelement legs is of the same material as the second metal plate.

6 Claims, 4 Drawing Figures

HEAT GENERATOR

This is a continuation of application Ser. No. 290,161, now abandoned, filed Sept. 18, 1972.

This is a continuation-in-part application of pending U.S. patent application Ser. No. 38,766, now abandoned filed May 19, 1970.

DESCRIPTION OF THE INVENTION

The invention is an improvement over the heat generator disclosed in pending patent application Ser. No. 775,612, filed Novemeber 14, 1968 and assigned to the assignee of the present application. In the heat generator disclosed in the aforedescribed patent application at least one thermoelectric structural component is positioned between a hot heat exchanger and a cold heat exchanger. The thermoelectrical structure component comprises two thermoelement legs of opposite conductivity type. The thermoelement legs are connected to each other at their hot ends via a contact bridge which is electrically and thermally conductive. The front surfaces of the cold ends are contacted by metal plates provided with electrical terminals or electrical contact lugs. The metal plates are connected to the cold heat exchanger in electrically insulating and thermally conductive manner, and at least part of the hot heat exchanger is provided as a type of mosaic comprising contact bridges of the components.

Components which only rest on the cold heat exchanger are known. Such components have thermoelement legs of substantially semicylindrical cross-section. The contact bridges and metal plates of such components must be in good thermal contact with the heat exchangers, since the efficiency of a heat generator depends, among other things, upon such heat transfer. Furthermore, because of the high temperatures at which a heat generator must operate, considerable thermal or heat expansions occur and must be compensated by an attachment of the thermoelectric component between the heat exchangers.

U.S. Pat. No. 3,269,875 discloses apparatus in which an elastic energy accumulator is provided between the component and a heat exchanger, in order to compensate for the thermal stresses, while maintaining a good heat transfer. Although such pressure contacts widely meet the prescribed requirements, the installation of an elastic energy accumulator considerably complicates the mechanical structure of the heat generator. Furthermore, there is always a possibility that the component may shift edgewise. This would result in a high heat resistance. In addition, when the operating conditions are extremely unfavorable, for example, thermal or heat expansions may still occur which are not compensated for and which may therefore damage the components. A heat generator of such structure therefore requires costly construction equipment and thus does not fulfill the requirement of high operating reliability.

The aforedescribed component assures the compensation of thermal stresses in the direction of the axis of the thermoelectric component, by eliminating pressure contacts, and provides good thermal contact. The component is positioned in the heat generator in a locally fixed relation, due to its connection to the cold heat exchanger. The metal plates rest, guarded against edgewise shifting, on the heat exchanger, electrically insulated from and thermally conductive therewith. Therefore, a change in the heat conducting contact cannot occur. On the hot side, the heat exchanger is substantially provided by the contact bridge itself. When the heat expands in the axial direction of the component, said component may expand, unhindered, into the space intended for the source of heat. There is therefore no danger of breakage of the component due to thermal stresses in the direction of the axis of the component. It is of special importance that the heat energy arrive at the hot contact bridge directly without the interpositioning of an additional heat exchanger and that the heat resistance produced by the additional heat exchanger be avoided. The efficiency of the heat generator is therefore an optimum, with regard to a direct heat transfer.

The principal object of the invention is to provide a new and improved heat generator.

An object of the invention is to provide a heat generator wherein thermal expansion is compensated transversely of the longitudinal axis of the structural components.

An object of the invention is to provide a heat generator which functions with efficiency, effectiveness and reliability.

In accordance with the invention the metal plates of each thermoelement are provided with connecting terminals and contact a ceramic plate which is metallized on both surfaces. The surface of the ceramic plate facing away from the legs of the thermoelement contacts a second metal plate. At least one surface of the metal plate which contacts the legs of the thermoelement, extends parallel to the front surfaces of the legs of the thermoelement and comprises the same metal as the second metal plate.

The lateral thermal expansion of the metal plates having the connecting terminals, and the bilaterally metallized ceramic plates produce shearing forces which may result in breakage of the components due to the stresses associated with temperature changes. The second metal plate compensates the shearing forces to a considerable extent and reduces the propensity of the components to break as a result of the stresses due to temperature changes.

Preferably, each metal plate comprises two parts. One of the parts of each metal plate contacts the front surface of the legs of ther thermoelement and the other has the terminals and contacts and ceramic plate. The part of the plate having ther terminals thus has better electrical conductivity than does the part of the plate contacting the legs of the thermoelement. The part of the plate which contacts the legs of the thermoelement and the second metal plate, which contacts ther ceramic plate comprise the same material.

The two legs of ther thermoelement, the hot ends of which are connected by a contact bridge may be provided with a common second metal plate 24 which contacts the ceramic plates 20 and/or with a common bilaterally metallized ceramic plate the metallization of which is interrupted by a non-conductive strip on the surface facing the legs of the thermoelement.

The second metal plate 24 which contacts the surface of the ceramic plate facing away from the legs of the thermoelement preferably comprises tungsten. The plate having the terminals preferably comprises silver. Ther ceramic plate preferably comprises aluminum oxide or beryllium oxide.

In accordance with the invention, a heat generator comprises a thermoelectric component positioned between a hot and a cold heat exchanger. The component has two thermoelement legs of opposite conductivity type. An electrically conductive and thermally conductive contact bridge connects the thermoelement legs of the thermoelectric component at their hot ends. Each of the thermoelement legs has a hot end, a cold end and a front surface at its cold end. First metal plates contact the front surfaces of the cold ends of the thermoelement legs of the thermoelectric components. The first metal plates have electrical terminals. Coupling means couple the metal plates to the cold heat exchanger in electrically insulating and thermally conducting relation. The coupling means comprises a bilaterally metallized ceramic plate. The ceramic plate has a surface facing the thermoelement legs of the thermoelectric component and contacting the first metal plates and a surface away from the thermoelement legs. A second metal plate contacts the surface of the ceramic plate facing away from the thermoelement legs. At least one surface of the first metal plates comprises the same material as the second metal plate.

The first metal plates comprise two parts in juxtaposed relation with one of the two parts contacting the thermoelement legs and the other of the two parts having the electrical contacts and contacting the ceramic plate of the coupling means. The other of the two parts comprises metal having better electical conducting characteristics than the first part. The one of the two parts and the second metal plate of the coupling means comprises the same metal.

A non-conductive strip interrupts the metallization of the surface of the ceramic plate of the coupling means facing the thermoelement legs of the thermoelement component.

The second metal plate of the coupling means comprises tungsten. The other of the two parts of the first metal plates comprises silver. The ceramic plate comprises one of the group consisting of aluminum oxide and beryllium oxide.

It is desirable that both legs of the thermoelement of the heat generator be in good thermal-conductivity connection with the cold heat exchanger and that they be electrically insulated against the same. To this end the thermoelement legs are separated, from the cold side by means of a good heat-conducting, but electrically insulating ceramic plate. This ceramic plate has an expansion coefficient which differs considerably from the metals which bear against its surface. It is, therefore, the object of this invention to compensate for these forces which are directed transversely of the axial direction in order to avoid the thermal stresses which are directed transversely of the thermoelement legs and which might otherwise lead to the damage or destruction of these legs inasmuch as latter are usually made of very brittle material.

The ceramic layer is relatively thick and has an expansion coefficient that varies considerably from the expansion coefficient of the adjacent metal layers. Moreover, a ceramic body cannot be made so thin as to prevent this heat expansion through the adjacent metals. Hence, the present invention does not prevent the heat expansion rather heat expansion does occur in the ceramic body but the transfer of the expansion to the thermoelements is prevented by providing both sides of the ceramic body with a layer of the same metal, for example tungsten, which absorbs the heat expansion of the ceramic body thereby preventing the transfer of thermal stresses to the thermoelements.

In order that the invention may be readily carried into effect, it will now be described with reference to the accompanying drawings, wherein.

Figure 1:
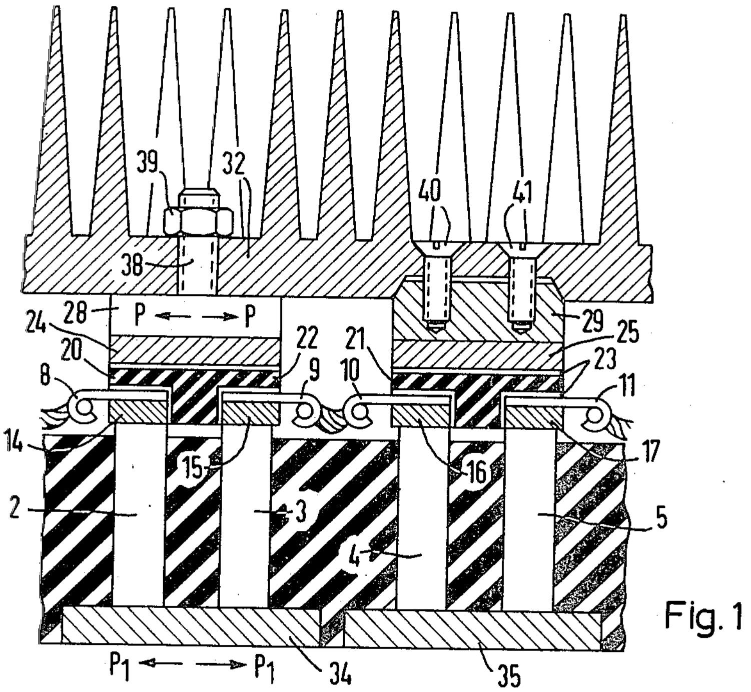
FIG. 1 is sectional view of one embodiment of the heat generator of the invention.

In the drawings the thermoelement legs of the components may comprise a germanium-silicon alloy having iron disilicide or said legs may comprise a manganese-silicon alloy. In a germanium-silicon alloy one thermoelement leg is provided with p conductivity type by a doping process with boron, gallium or indium, for example. The other thermoelement leg is provided with n conductivity type by doping with phosphorus, arsenic or antimony for example. The crosssections of the thermoelement legs are preferably semicylindrical whereby said legs adjoin the flat surface of their housing or jacket via electrically insulating material.

In FIG. 1, two different components are provided for the heat generator. Each of the components comprises thermoelement legs 2,3 and 4,5 respectively. The thermoelement legs 2 and 3 are of opposite conductivity type and also the thermoelement legs 4 and 5 are of opposite conductivity type. The hot ends of the thermoelement legs 2,3 are electrically connected to each other via a contact bridge 34. The hot ends of the thermoelement legs 4,5 are electrically connected to each other via a contact bridge 35.

A pair of tungsten or molybdenum plates 14,15 are affixed to the front surfaces of the thermoelement legs 2,3 on the cold ends thereof and a pair of tungsten or molybdenum plates 16,17 are affixed to the front surfaces of the thermoelement legs 4,5. The tungsten plates 14,15,16,17 may be affixed by any suitable means such as, for example, alloying or soldering. A silver plate or pair of silver plates 8,9 is provided in contact with the tungsten plates 14,15 respectively and a silver plate or pair of plates 10,11 is provided in contact with the tungsten plates 16,17 respectively. The silver plates 8,9,10,11 have electrical terminals or terminal lugs as shown in the drawings. The tungsten plates 14,15 shield the first semiconductor 2,3 from the solder used to affix the silver plates 8,9 and the tungsten plates 16,17 shield the second semiconductors 4,5 from the solder used to affix the silver plates 10,11.

The tungsten plates 14,15,16,17 prevent the solder from diffusing into the semiconductor material of the thermoelement legs 2,3,4,5 of each of the semiconductor components and thereby prevent the alteration of the characteristics of said semiconductor components. The adjacent semiconductor components are electrically connected to each other via a silver conductor which is affixed to the electrical terminals of each of the silver plates 8,9,10,11.

The thermoelectric legs 2,3 and 4,5 are affixed to the heat exchanger 32 at their cold ends via individual ceramic plates 20 and 22 respectively which are positioned upon the silver 8,9,10,11 plates. Then seen from the thermoelectric legs 2,3 and 4,5, the ceramic plates 20 and 21 are each divided by a bridge portion into two halves. Each of the pair of ceramic plates 20, 22 is bilaterally metallized, that is, each of the ceramic plates 20 and 22 is metallized on each of its surfaces. Thus ceramic plate 20 has an upper and lower metallized surface 22 and ceramic plate 21 has an upper and lower metallized surface 23. These metallized surfaces facilitate connection with adjacent metal plates as will be explained. The metallized ceramic plate 22 is soldered to the silver plates 8,9 at the cold end of thermoelectric legs 2,3 and the metallized ceramic plate 21 is soldered to the silver plates 10,11 at the cold end of the thermoelectric legs 4,5. This prevents a short circuit from occurring in the thermoelement legs. The ceramic plates 20 and 21 comprise electrically insulating and thermally conducting material such as, for example, aluminum oxide or beryllium oxide. The surface of each of the ceramic plates 20 and 21 facing away from the thermoelement legs is soldered to a tungsten plate 24 and 25 respectively. The tungsten plates 24 and 25 each are single plates provided in common for both thermoelement legs 2,3 and 4,5 respectively.

Metallic connecting pieces 28 and 29 are soldered to the tungsten plates 24 and 25 respectively and are utilized to fasten the thermoelectric legs 2,3 and 4,5 respectively to the best exchanger 32 by means of the bolt 38 on connecting piece 28 and nut 39 and by means of the two screws 40,41. The thermoelement legs 2,3 and 4,5 are bolted to the heat exchanger 32 at the cold end of said exchanger provided with heat exchange terminals or lugs.

The silver plates 8,9 and 10,11 and the ceramic plates 20 and 21 are interposed between the tungsten plates 14,15 and 24 and between 16,17 and 25 respectively. Lateral thermal expansions of the silver plates 8,9 and 10,11 and of the ceramic plates 20 and 21 are prevented by the tungsten plates 14,15 and 24 and by the tungsten plates 16,17 and 25 This considerably reduces the possiblity of breakage of the semi-conductor components, due to shearing forces.

In the illustrated connection or coupling of the thermoelectric legs 2,3 and 4,5, such thermoelement legs are in direct mechanical connection with the heat exchanger 32. The thermoelement legs are thus locally well affixed and reliably fastened against shifting or edgewise movement. The heat transfer is also very good since no insulating air or gas layers may develop in the path of the heat current. The connecting pieces 28,29 preferably comprise good heat conducting material such as for example, silver, in order to decrease the heat resistance as much as possible and thereby increase the efficiency of the heat generator as much as possible.

Both thermoelectric legs 2,3 and 4,5 have contact bridges which extend beyond the lateral boundaries of such thermoelement legs respectively. On the hot end of the heat generator, the heat exchanger is constructed directly via such contact bridges. This provides a direct transfer for the energy from the heat source to the contact bridges, without the interposition of a second heat exchanger. This is advantageous, since an additional heat exchanger would provide additional heat resistance. The heat or thermal energy may be irradiated upon the contact bridges, or the contact bridges may be directly heated by a flame, for example. To avoid a direct heat conductance to the cold end of the heat generator the space between the thermoelement legs 2,3 and 4,5 and between the contact bridges is filled with heat insulating material.

A suitable material for the contact bridges 34,35 may comprise, for example, $(Mo_{0.46}Co_{0.54})_{0.1}Si_{0.9}$. This material provides the particular advantage that the contact bridges may be produced during a sintering process, so that the contact bridges may be manufactured in many shapes and configurations. Furthermore, inner portion of the contact bridges may be sintered together with the thermoelement legs, after the contacting of the inside portion. This process permits a very simple production of structural components with the most varied configurations of the contact bridges, starting with a basic structural component.

The arrangement of the present invention compensates for the transverse forces. P which occur at high temperatures. For this purpose the opposite sides of the ceramic plates 20, 21 are in contact with elements made of the same material. The ceramic plates 20,21 are provided with the metal coatings 22, 23 to facilitate connection with the adjacent metal layers.

Moreover, the ceramic plates 20,21 in connection with the plates 14,15,16,17 compensates for expansion forces ($P_1$) which are transmitted from the hot side, by the contact bridges 34, 35, to the legs 2,3,4,5. It is pointed out that heat generators of the type under consideration operate at high temperatures. For example, a temperature of approximately 1,000° C, may exist on the hot side, at the contact bridges 34,35 while the temperature on the cold side, at the connection conductors 8 to 11, may amount to only about 200° C. Hence, the temperature differential is about 800° C.

The bridges 34,35 consist of a material whose thermal expansion coefficient is about as low as the thermal expansion coefficient of ther germanium-silico legs 2,3,4,5 in order to stabilize the solder connections between the contact bridges 34, 35 and the legs 3,4,5,6 even during thermal alternating stress. These tungsten- or molybdenum bodies 14 to 17 and 24,25 function to prevent the transfer of impermissibly high bending and shearing forces, to the semiconductor legs which are comprised of a very brittle material. Thus, the conpensation bodies 14,15 and 24, and 16,17 and 25 make the respective element 2,3 and 4,5, respectively also independent on the type of fastening to the cold side.

Each of the legs 3,4,5,6 has a self-supporting arrangement which means that each element is affixed only at the cold heat exchanger 32 and the elements can freely expand in an axial direction of the legs and, thus, in the direction toward the hot side. This obviates a special or separate heat exchanger on the hot side.

Figure 3:
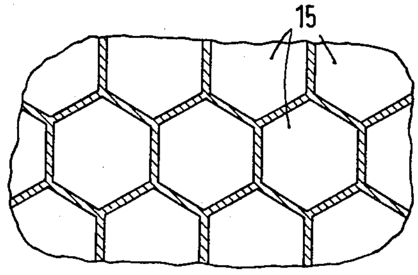
FIG. 3 is a top view of the hot side of another embodiment of the heat generator of the invention.
Figure 2:
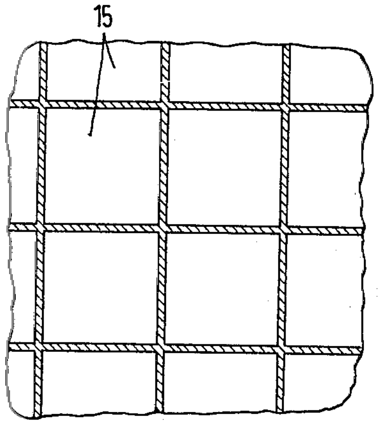
FIG. 2 is a top view of the hot side of an embodiment of the heat generator of the invention.

FIGS. 2,3 are a top view of the heat exchanger at the hot side. The exchanger is of mocasic pattern, due to enlarged contact bridges of the type of FIG. 1. The squareshaped and hexagonal-shaped patterns illustrate that the semiconductor components may be densely packed in a closed heat exchanger. Movement of the contact bridges perpendicularly to the plane of the sheet of illustration, which may be caused by thermal expansion, is feasible. The spaces between the contact bridges 15, of FIGS. 2 and 3, may be filled in with electrically insulating and heat insulating material.

Figure 4:
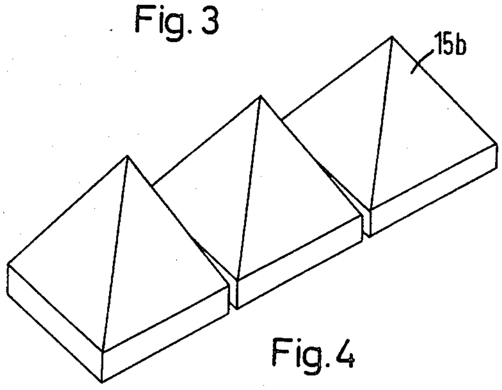
FIG. 4 is a perspective view of contact bridges which may be utilized in the heat generator of the invention.

Embodiments of contact bridges having enlarged heat exchange areas are illustrated in FIG. 4. In FIG. 4, a plurality of contact bridges **15*b* are illustrated. The surface of each of the contact bridges 15*b* facing the energy source is in the configuration of a pyramid. The enlarged heat exchange area helps to improve the heat conductive characteristics of the contact bridge and affords a considerable saving of material. To accomplish this, it is particularly preferable to produce the enlarged contact bridge particularly the contact bridge 15***b* on the semiconductor component in FIG. 1, by means of sintering.

While the invention has been described by means of specific examples and in specific embodiments, we do not wish to be limited thereto for obvious modifications will occur to those skilled in the art without departing from the spirit and scope of the invention.

What is claimed is:

1. A heat generator for converting heat energy into electrical energy, comprising a plurality of thermoelements with two thermoelement legs of opposite conductivity type of germanium-silicon alloy connected electrically in series and thermally in parallel, each of said thermoelement legs having a hot end and a cold end with the cold end being connected in electrical insulation and thermal conductivity with one another and with a cold heat exchanger, a pair of first metal layers contacting each of said cold ends of said thermoelements, one of said pair of said first metal layers having electrical terminals, rigid coupling means coupling said pair of first metal layers to said cold heat exchanger in electrically insulating and thermally conducting relation, said coupling means including a ceramic plate and a second metal plate, a metal layer on both sides of said ceramic plate, said ceramic plate having one of its metal layer sides facing said thermoelements and affixed to one of said pair of first metal layers, and said second metal plate bridging the cold ends of the legs and affixed to the other of the metal layer sides of said ceramic plate, said second metal plate and the part of said pair of first metal layers which contacts said thermoelements being of the same material selected from the group consisting of tungsten and molybdenum.

2. A heat generator as claimed in claim 1, wherein said pair of first metal layers comprise two layers in juxtaposed relation with one of the two layers contacting the thermoelements and the other of said two layers having said electrical contacts and contacting the ceramic plate of said coupling means, the other of said two layers comprising metal having better electrical conducting characteristics than that of the one of said two layers.

3. A heat generator as claimed in claim 1, wherein both of said legs are affixed to said cold heat exchanger by means of a single and common fastening connection.

4. A heat exchanger as claimed in claim 2 wherein said other of said two plates of said pair of first metal layers is made from a metal selected from the group consisting of silver, copper, gold, platinum and aluminum.

5. A heat generator as claimed in claim 1 wherein a nonconductive strip interrupts the metallization of the surface of the ceramic plate of said coupling means facing the thermoelements of said thermoelectric component.

6. A heat generator as claimed in claim 1 wherein said ceramic plate comprises one of the group consisting of aluminum oxide and berylium oxide.

* * * * *